Patented Dec. 12, 1939

2,183,202

UNITED STATES PATENT OFFICE 2,183,202

PROCESS FOR OBTAINING COPPER LININGS

Paolo Misciattelli, Rome, Italy

No Drawing. Application June 7, 1937, Serial No. 146,974. In Italy July 1, 1936

2 Claims. (Cl. 91—69.1)

The subject matter of my present invention is a process for obtaining copper linings, e. g. for the manufacture of copper mirrors, and the copper or silver mirrors obtained by such methods.

My present invention is based on the discovery that formaldehyde is capable of reducing, in the cold, the cuprotartaric (or cuproglyceric) complex to metallic copper in the presence of traces of precipitated silver, or traces of colloidal silver.

The invention is now described in greater detail by means of the following exemplary embodiment thereof which, however, is solely illustrative and not limitative in character.

Example

A sheet of glass is washed with stannous chloride and distilled water. A known silvering solution is prepared, comprising for instance ammoniacal silver nitrate and invert sugar, and this solution is added by so proceeding that the silver is deposited in so thin a layer as to give the glass a very faintly blue color if observed by transparency. The glass plate thus prepared is again washed with water, and then the Solution A (see below) is rapidly poured out thereon so as to suddenly flood the whole plate.

Solution A 4 g. of copper sulphate, 15 g. of Seignette salt (sodic potassic tartrate) and 6 g. caustic soda in sticks are dissolved in 1,000 g. of distilled water, and to this solution 15 cc. of a 1% arabic gum solution are added. Immediately before applying such solution 100 cc. of commercial 40% formaldehyde is added.

According to my present invention the reaction between formaldehyde and caustic soda is prevented by the presence of traces of a colloid, such as arabic gum, agar-agar, or the like, as such reaction would produce a consequent development of hydrogen which would cause the detachment of the copper layer from its support.

When operating at ordinary temperature for obtaining a good and sufficiently thick deposit of copper, a time of from half to one hour will be needed according to the temperature of the surrounding atmosphere.

A preferred form of realization of the invention has been above described, but it is understood by those skilled in the art that both the solution and the process may be modified in their non-essential details within the scope of my invention.

Having now particularly described and ascertained the nature of my said invention and in what manner the same is to be performed, I declare that what I claim is:

1. The process for the production of copper linings for the manufacture of copper mirrors, coppered silvered mirrors and the like, comprising precipitating metallic copper in the cold by reduction with a reducing agent consisting of formaldehyde in the presence of silver from a solution consisting of caustic soda, gum arabic, a cuprotartrate, and water.

2. The process for the production of a copper lining upon a support, comprising first producing a very thin layer of silver on said support, and then precipitating a lining of metallic copper in the cold on said thin silver layer by reduction with a reducing agent consisting of formaldehyde from a solution consisting of caustic soda, gum arabic, a cuprotartrate, and water.

PAOLO MISCIATTELLI.